United States Patent [19]

Paivanas

[11] Patent Number: 5,683,250
[45] Date of Patent: Nov. 4, 1997

[54] FLIGHT DEMONSTRATOR

[76] Inventor: Evan Paivanas, 72 Gladstone Ave., Buffalo, N.Y. 14207

[21] Appl. No.: 767,632

[22] Filed: Dec. 17, 1996

[51] Int. Cl.[6] .......................... G09B 19/16; A63H 27/18
[52] U.S. Cl. .................................. 434/32; 446/32
[58] Field of Search ..................... 446/31, 32; 434/30, 434/32, 35, 45

[56] References Cited

U.S. PATENT DOCUMENTS

| | | | |
|---|---|---|---|
| 2,034,298 | 3/1936 | Holman | 432/32 |
| 2,624,152 | 1/1953 | Sneed | 446/31 |
| 3,087,257 | 4/1963 | White | 446/31 |
| 3,222,815 | 12/1965 | Struck | 446/31 |
| 3,391,484 | 7/1968 | Darin | 446/31 |
| 3,556,520 | 1/1971 | Hunt | 446/32 |
| 4,162,589 | 7/1979 | Clair | 446/31 |
| 5,232,391 | 8/1993 | Vaughns | 446/30 |
| 5,334,070 | 8/1994 | Yu et al. | 446/31 |

FOREIGN PATENT DOCUMENTS 3207594  9/1993  Germany .................... 446/31

*Primary Examiner*—Paul J. Hirsch
*Attorney, Agent, or Firm*—Crossetta & Associates

[57] ABSTRACT

A novel instrument for demonstrating flight principles is disclosed wherein a simulated aircraft is mounted to the end of a tube member by an arrangement wherein finger tip linear and rotational manipulation of a single control enables tail and wing control surfaces respectively, to move in coordinated response to demonstrate aircraft maneuver response to control surface movement.

16 Claims, 4 Drawing Sheets

FLIGHT DEMONSTRATOR

FIELD OF THE INVENTION

The present invention relates to a novel instrument for demonstrating flight principles and aircraft control surface movement in response to pilot operation of controls. The device is lightweight and is operable with single-handed, finger-tip manipulation so as to enable an instructor to conveniently demonstrate aircraft control surface movement and responsive flight maneuvers, while providing a repetitive standard to enable the student to refresh and confirm his or her memory and understanding of aeronautic principles.

BACKGROUND OF THE INVENTION

There is a continuing need for a device suitable for use as an aid for demonstrating a plurality of diverse aircraft control surface movements which enable responsive aircraft flight maneuvers that must be understood and be familiar to the pilot or engineer who may be called upon to operate or build an aircraft comprising such surfaces.

In the teaching profession, it is desirable to use visual aids to enable learning and reinforce student understanding in regard to complex matters. A teaching aid which clearly demonstrates a complex learning experience, particularly an aid which itself engages the interest of the student and/or which invokes a desire to participate in the demonstration in a game simulation environment, is most desirable in that it creates an enhanced learning experience.

In the teaching of aeronautical engineers, pilots and the like it is essential the student become fully familiar with the movement of aircraft control surfaces and have a full and immediately recallable understanding of how such movement effects the flight maneuvering of an aircraft. Pilots must be sure and reflexive in their response to flight events, and control surfaces are the tools through which they must be intuitively responsive. The engineer designs and builds the control surface tools of the pilot and thus must have a clear and sure understanding of their operation and effect.

It is an object of the present invention to provide a teaching instrument for demonstrating flight principles.

It is another object of the invention to provide a flight demonstrating instrument which has control surfaces which move through coordinated positions to demonstrate flight maneuvers.

It is a further object of the invention to provide a flight demonstrator which can be conveniently single-handed manipulated to engage coordinated aircraft control surface movement for demonstration of flight events.

It is a still further object of the invention to provide a flight demonstrator device in which hand manipulation of aircraft control surfaces is ergonomically coordinated with natural hand directional movements.

It is yet another object of the invention to produce a flight simulator toy for recreational use.

These and other objects of the invention will become apparent from the following description of the invention.

SUMMARY OF THE INVENTION

The present invention comprises a simulated aircraft, hingedly connected to wand, such as a telescoped coaxial tube means, in an arrangement wherein simulated aircraft control surfaces can be caused to pivot in response to linear and rotational movement of the coaxial tube means in a manner which simulates aircraft flight maneuvers.

The coaxial tube means of the invention comprises an outer tube having a coaxial inner tube or rod telescoped from opposite ends of the outer tube. The outer tube is enabled for rotational and linear movement in relation to the inner tube or rod. The coaxial tube means comprises a manipulating end portion and has an opposite activating end portion. The manipulating end portion of the inner tube or rod is arranged to extend beyond the corresponding manipulating end portion of the outer tube and is arranged for gripping the inner tube against about a palm of an operator. The manipulating end of the outer tube is arranged for enabling rotational and linear movement of the outer tube in relation to the inner tube or rod through movement of the thumb, fingers or combination thereof by the operator.

In one embodiment of the invention the inner and/or outer tube of the manipulating end portion is fitted with a gripping means having a surface to enable positive grip during hand manipulation. In a preferred embodiment, an elongated enlarged gripping means comprising a suitable gripping surface is fitted to the inner and outer tube means, sized to enable convenient gripping of the inner and outer tube or rod.

Thus, the manipulating end of the coaxial tube means is arranged so that the operator can conveniently hold the tube means in one hand with the inner tube being engaged by the palm area or thereabout of the hand to support the instrument and resist movement of the inner tube or rod, while the outer tube can be rotated through an arc or linearly moved backward and forward in respect to the inner tube by manipulation of the thumb and/or fingers of the operator.

The activating end portion of the coaxial tube means is arranged to support the simulated aircraft and translate linear and rotational manipulation of the outer tube in respect to the inner tube or rod to movement of the simulated aircraft and control surfaces thereof.

The simulated aircraft can be made of any convenient material and generally comprises a combination of components designed to the general appearance of an aircraft having an elongate fuselage member and appropriate airfoils including a tail section generally comprising elevator and/or rudder and main support wing members mounted to enable airfoils on opposite sides of the elongate fuselage member of the simulated aircraft. In one embodiment, the fuselage, tail and main support wing members comprise generally flat panels which are two dimensionally shaped, sized and arranged in the appearance of a generic aircraft. In another embodiment the components are three dimensionally configured to shape, size and surface configurations of a particular aircraft to provide a more realistic visual display.

In an embodiment of the invention, the rear of the simulated aircraft is pivotally mounted to the activating end portion of the coaxial tube means. In a preferred embodiment of the invention, a first point at the rear of the fuselage and preferably at the rudder of the tail section is pivotally mounted to the activating end portion of the inner tube or rod and a spaced apart second point preferably along the rudder is pivotally connected with the activating end portion of the outer tube, in an arrangement wherein linear movement of the outer tube in respect to the inner tube or rod causes the tail member to pivot through a plane in an axis of the tube member. In such embodiment, wherein the rudder extends upwardly, the second point is generally spaced upwardly from the first point and the pivotally connected arrangement with the outer tube generally comprising an elongated rod member which pivotally mounts at one end to the second point along the rudder and at the other end to the activating end portion of the outer tube.

In a most preferred embodiment, the first point is both pivotally and rotatably mounted to the activating end portion of the inner tube or rod so the tail member can be pivoted and rotated through diverse planes of an axis of the coaxial tube member and the inner tube or rod can rotate through an arc about said axis. In such embodiment an activating means is provided at the end portion of the inner tube or rod which engages aileron control surface linking means arranged for enabling coordinated movement of aileron control surfaces in accord with direction and extent of rotation of the inner tube or rod through the arc.

In a further preferred embodiment, means are provided, preferably at the second point of attachment, which engage elevator control surfaces and are arranged for enabling coordinated movement of the elevator control surfaces in accord with linear movement of the outer tube in respect to the inner tube or rod.

Thus, in a preferred arrangement of the invention, tail wing control surfaces and aircraft nose attitude are in coordinated connected control with the linear manipulation of the upper tube along the lower tube or rod, while aileron control surfaces are in coordinated connected control with the rotational manipulation of the upper tube around the lower tube. Coordination of the direction of control surface movement is preferably such that counterclockwise rotation provides control surface movement for left turn and clockwise for right turn, together with pitch control, e.g. backward linear movement for nose up attitude and forward linear movement for nose down attitude, providing an ergonomically efficient and natural action and response instrument.

Movable aileron control surfaces of the wing airfoils, are preferably hingedly attached to a fixed support wing airfoil in an arrangement wherein an aileron can be pivoted through an arc in coordinated movement with an aileron of another airfoil through simple mechanical linkage. In a preferred embodiment of the invention, wing ailerons are attached to fixed wing airfoils by continuous hinges along their length and mechanical linking means is cooperatively arranged to engage corresponding ailerons on opposite wings to pivot the ailerons in opposing direction upon imposition of a single directional force on the mechanical linkage. Thus, clockwise rotation of the outer tube in a first direction engages the mechanical linkage and causes an aileron on the right fixed wing airfoil to pivot upwardly from the airfoil representing displacement of the air flow over the top surface of the airfoil while simultaneously causing an aileron on the left fixed wing airfoil to pivot downwardly representing a disruption of the air flow over the bottom surface of the airfoil. Counterclockwise rotation causes the reverse pivot movement of the ailerons and reverse effect, while rotation of the outer tube to a point therebetween, pivots the ailerons to a static spacial position in respect to the airfoil.

A mechanical linkage suitable to achieve such aileron movement comprises an elongate linear moveable element extending between and pivotally connected to angled elements which are pivotally connected to the aircraft, such that linear movement of the moveable element causes the ends of the angled elements to move through an arc in respect to their pivot connection to the aircraft. Pins extending from the ailerons pass through holes in the ends of the angled elements and as the ends of the angled elements pass through an arc the pins move and the aileron connected thereto pivots upwardly of downwardly along its hinge. In a preferred embodiment, the moveable element and angled elements are comprised in a quadrilateral assembly with a fixed element which adds structural stability.

In a preferred embodiment of the invention the elongate linear moveable element is connected along its length to the activating end of the coaxial tube member through a "U" shaped rod. The base of the "U" is hinged to the aircraft, one leg of the "U" engages the moveable element and the other leg engages the activating end portion of the coaxial tube member, such that rotation of the inner tube or rod through an arc in respect to the outer tube will cause the "U" shaped rod to pivot and linearly displace the moveable element.

In a most preferred embodiment the other leg of the "U" element engages the activating end portion of the inner rod or tube by means of a flexible member such as a flexible tube or spring, to enable non conflicting aileron movement and nose up, nose down movement. In a most preferred embodiment, the flexible hose or spring is connected by limited slip means to the inner rod or tube such that aileron movement is only through a defined arc of rotation of the inner tube in respect to the outer tube.

Movable elevator control surfaces of the tail member can also be hingedly attached to a fixed wing air foil at the tail member, but in a preferred embodiment of the invention a rear stabilizing airfoil, is attached to a rod which is pivotally attached to the rear of the aircraft to enable simple pivot movement of the elevator. In a most preferred embodiment, an end section of the airfoil is pivotally connected to the aircraft to enable demonstration of elevator control surface movement in response to control manipulation.

In a preferred embodiment of the invention, movement of an elevator surface is activated by the pivoting action at the second point of attachment. In accord with such, an extension of the pivot connector at the second point of attachment is pivotally attached to a rod which in turn pivotally engages the rod which pivots the elevator.

DETAILED DESCRIPTION OF THE INVENTION

FIGS. 1–5 illustrate a flight demonstration device of the invention wherein a simulated aircraft 50, is connected for manipulation by a coaxial wand 10 in an arrangement wherein control surfaces of the aircraft can be caused to pivot in response to linear and rotational movement of the coaxial wand.

Figure 1:
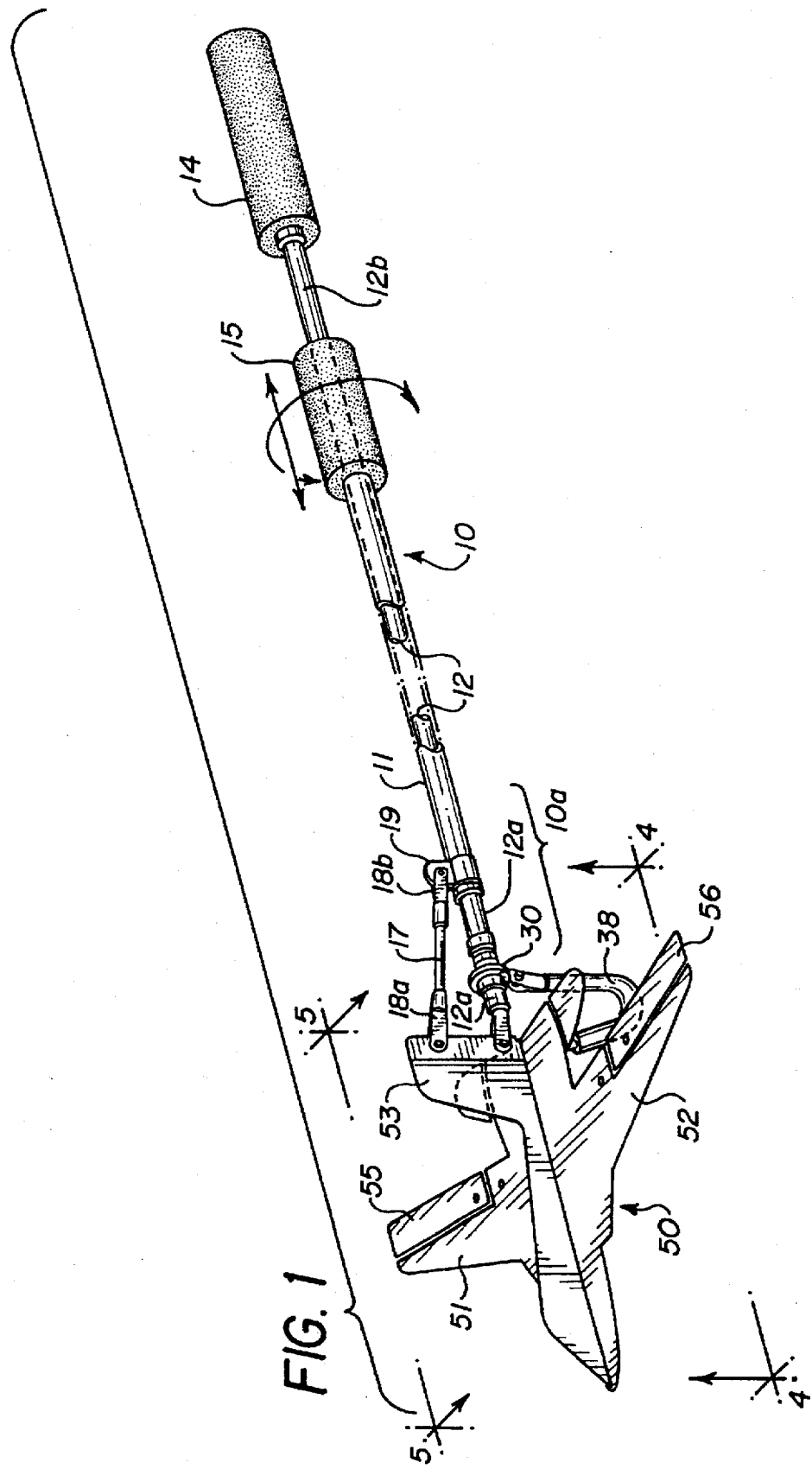
FIG. 1 illustrates a perspective view of a flight demonstration device of the invention.
Figure 2:
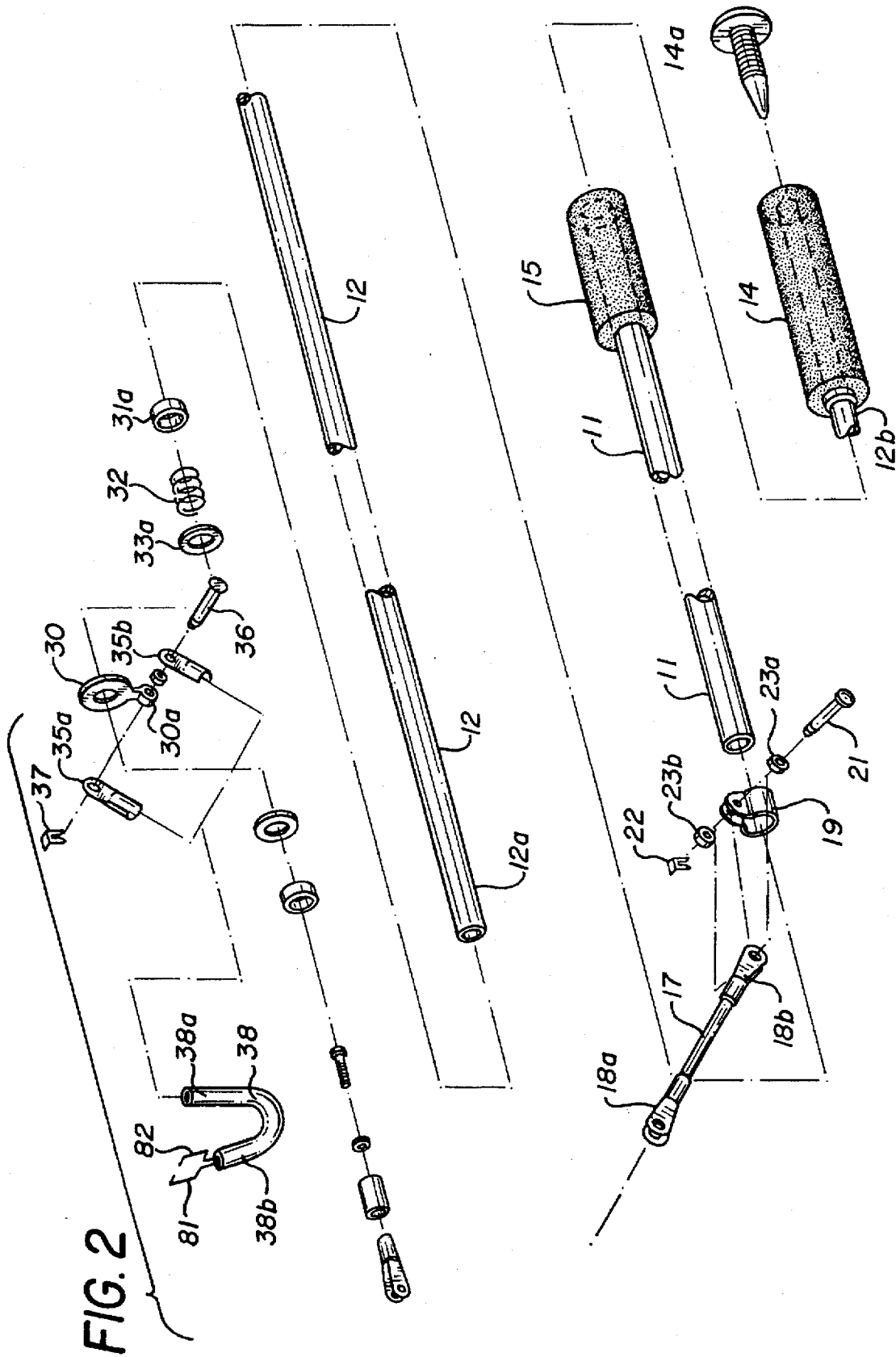
FIG. 2 illustrates an exploded perspective view of a coaxial wand member of the device of FIG. 1.

Referring first to FIGS. 1 and 2 wherein coaxial wand 10 is shown as comprised of outer tube 11, arranged with inner tube 12 telescoping from opposite ends of the outer tube and being illustrated as comprising ends 12a and 12b. Outer tube 11 is enabled for rotational and linear coaxial movement in relation to inner tube 12.

Coaxial wand 10 comprises manipulating end portion 10b enabled for gripping and manipulating the wand in an operator's hand; and, actuating end portion 10a which is enabled for engaging with linkage and actuating aircraft control surface movement and securing angle of attack of the simulated aircraft 50 as desired.

Manipulating end portion 10b of coaxial wand 10 comprises securing grip 14 arranged at about the manipulating end of inner tube 12 and finger grip 15 arranged at about the manipulating end of outer tube 11. Securing grip 14, comprising end plug 14a, is arranged to enable securing the manipulating end portion along about the palm of an operators hand, with finger grip 15 being arranged to enable rotational and linear movement of outer tube 11 in relation to inner tube 12 through movement of the thumb and/or fingers of an operator while securing inner tube 12 from movement.

In the illustrated embodiment, wand 10 is shown as comprised of coaxial tubes, preferably of a light weight rigid material such as aluminum, titanium, plastic or the like. It should be understood inner tube 12 may be a solid rod or the like.

Actuating end portion 10a of coaxial wand 10 comprises an elevator activating assembly and an aileron activating assembly, which are responsive to linear and/or rotational movement of the outer tube imposed at the manipulating end portion and engage linkage on the aircraft which moves the aircraft elevator and ailerons in flight coordination.

The elevator activating assembly is shown comprising connecting rod 17, having pivot fittings 18a and 18b mounted to opposite ends, with pivot fitting 18a pivotally engaging the tail section of the simulated aircraft, pivot fitting 18b pivotally engaging pivot band 19 (connected to outer rod 11) and rotatable pivot fitting 20 which is rotatably mounted to end 12a of inner tube 12 at a first end and pivotally mounted to the tail section of the aircraft. The arrangement of the elevator activating assembly is such that linear forward movement of tube 11 in respect to tube 12, causes the upper portion of the tail section of aircraft 50 to pivot forward about pivot 20, displacing the aircraft nose downwardly, and backward linear movement of tube 11 in respect to tube 12, causes the upper portion of the tail section of aircraft 50 to pivot backward about pivot 20, displacing the aircraft nose upwardly. Pivot 20 rotates as tube 11 rotates in respect to tube 12, to assure upward and downward nose movement regardless of tube 11 rotation.

Pivot band 19 is fictionally fitted around tube 11 by means of pin 21 which inserts through aligned holes in pivot fitting 18b through mating holes in tabs of band 19 and is fixed in place by pin clip 22 and spacers 23a and 23b.

Pivot 20 is illustrated as being rotatably mounted to end 12a of inner tube 12 by means of threaded screw 27 which loosely inserts through a hole in mounting block 25 and engages a mating threaded hole in pivot 20. Mounting block 25 is force fitted into end 12a of tube 12 such that pivot 20 is fixed at end 12a, but enabled to rotate.

The aileron activating assembly is shown as comprising slip ring 30, which is rotatably fitted around end portion 12a of tube 12 and held in place by the combined effect of friction rings 31a and 3b, spring 32 and washers 33a and 33b. In the arrangement of the assembly, friction ring 31a is force fitted over end portion 12a of inner tube 12 enabling a first linear stop. Spring 32 and washer 33a are arranged between friction ring 31a and slip ring 30 to provide a spring load force against slip ring 30. Friction ring 31b is force fitted over end portion 12a of inner tube 12 enabling a second linear stop with washer 33b being arranged between friction ring 31b and slip ring 30. The combined effect of the arrangement is that the spring pressure against slip ring 30 enables limited slip rotational movement of slip ring 30.

Pivot ends 35a and 35b are arranged for pivot mounting to slip ring 30 by means of pin 36, which inserts through aligned holes in pivot ends 35a and 35b, through the hole formed by tab 30a in slip ring 30, being fixed in place by pin clip 37 and spacers 38. Pivot ends 35a and 35b have half cylindrical ends which are aligned opposite and forcibly inserted into end 38a of flexible tube 38. links 81 and 82 are illustrated as inserting into end 38b of flexible tube 38 for connecting the aileron activating assembly to the aileron linkage of aircraft 50.

In the arrangement of the aileron activating assembly of wand 10, slip ring 30 enables limited slip rotational resistance to enable aileron activation within the limits of a defined arc, regardless of the rotation position of outer tube 11 in respect to inner tube 12.

For example, in the illustrated embodiment of the invention, hinged movement of the ailerons is at a static position at about midpoint within a defined arc of rotation of outer tube 11 in respect to inner tube 12, with links 81 and 82 arranged about perpendicular relative to the underside of the aircraft and linkage arrangement therefrom to left and right ailerons being such that the ailerons are at rest in a steady state horizontal flight enablement. Pivot movement of links 81 and 82, in a first direction to a stop position from the perpendicular, causes a first aileron to hingedly move upward and a second aileron to hingedly move downward. Pivot movement of links 81 and 82, in a second direction to a stop position from the perpendicular, causes the first aileron to hingedly move downward and the second aileron to hingedly move upward.

Links 81 and 82 are operably connected to end 38b of flexible tube 38, which in turn is operably connected to slip ring 30. As tube 11 is rotated through an arc in respect to tube 12, it also rotates through the same arc in respect to slip ring 30 until the slip ring incurs a higher resistance of maximum aileron travel. Similarly, aircraft 50 is caused to rotate through such same arc by the rigidity of the elevator activating assembly. As aircraft 50 rotates through the arc, slip ring 30 maintains the linear spacial positioning of flexible tube 38 such that links 81 and 82 become pivotally displaced from their perpendicular in respect to the aircraft under surface, moving the ailerons to pivot positions. As the ailerons reach a position of restraint from further pivoting, the slip ring begins to slip, thus enabling complete rotation of outer tube 11 in respect to inner tube 12, without further pivot of the ailerons.

Figure 3:
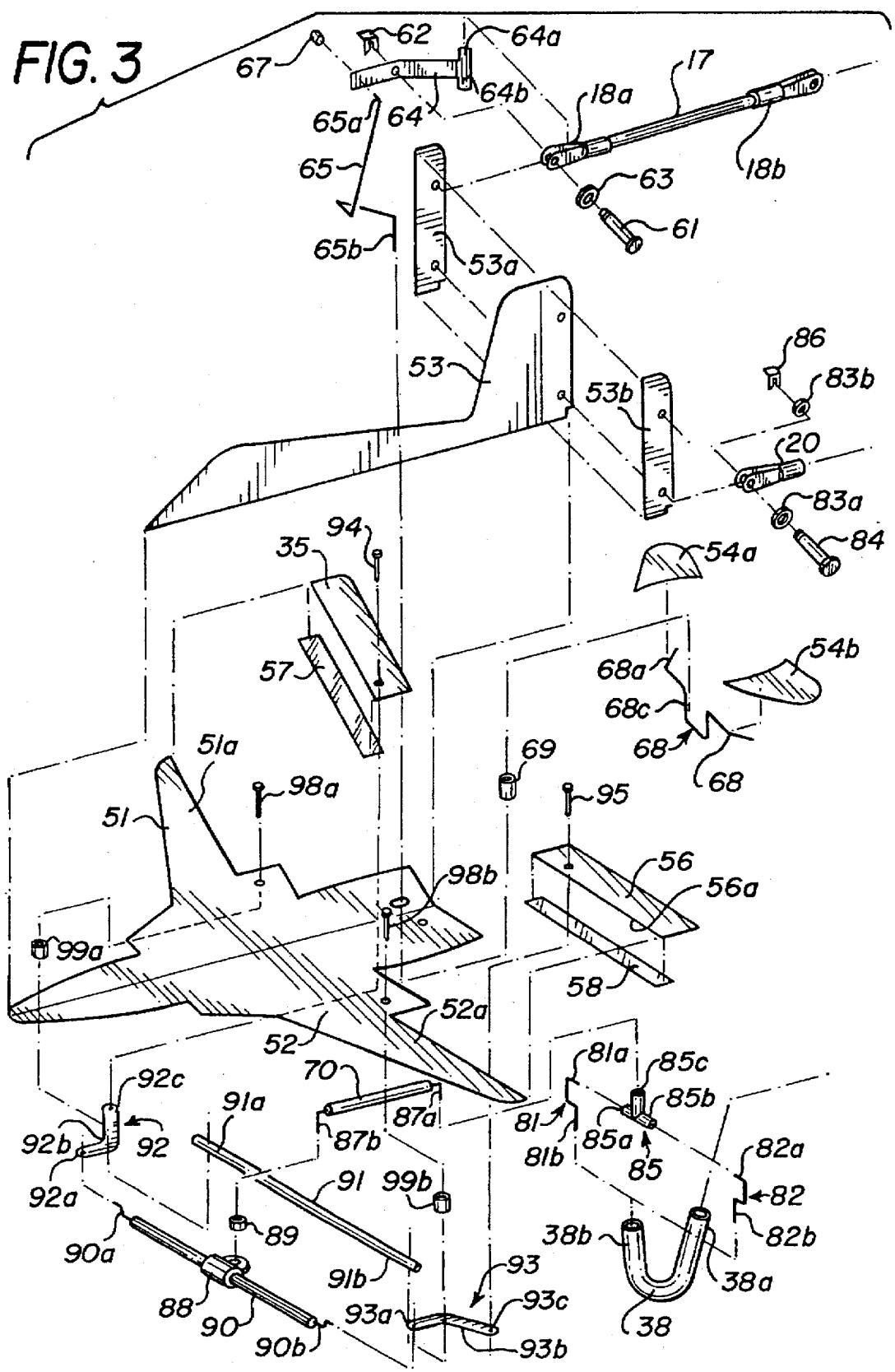
FIG. 3 illustrates an exploded perspective view of a simulated aircraft of FIG. 1.
Figure 4:
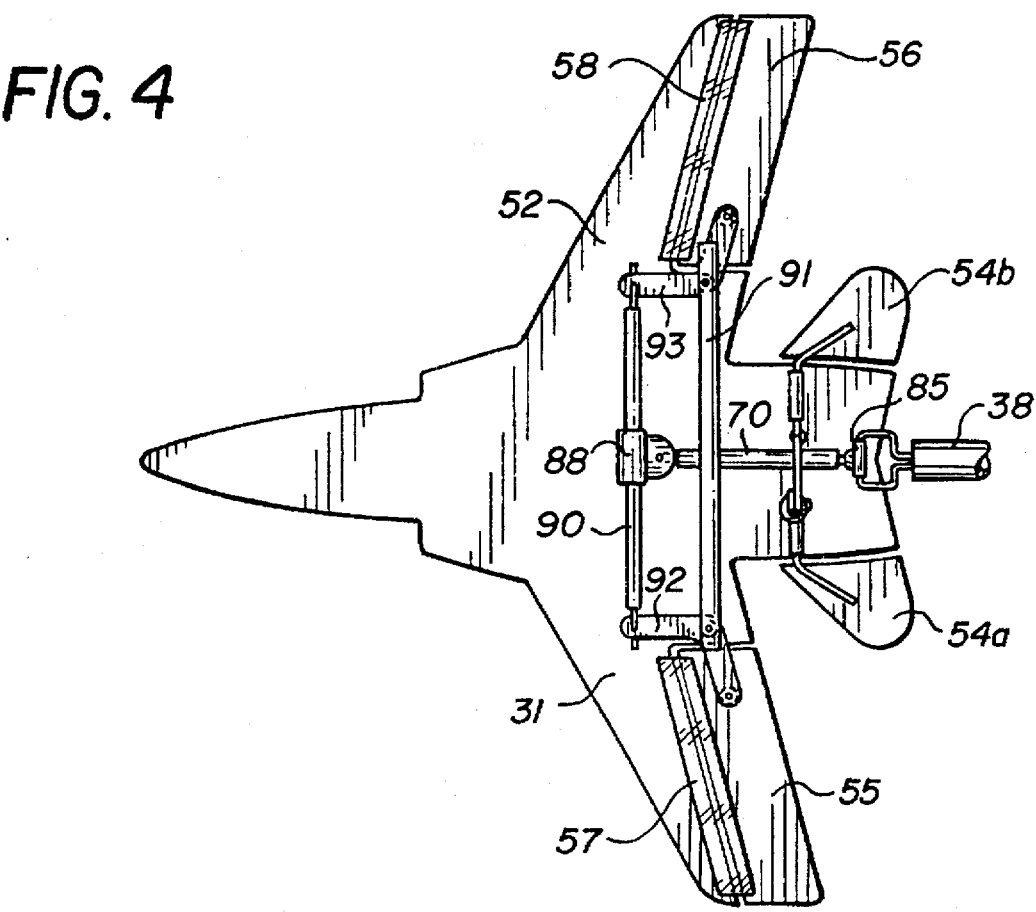
FIG. 4 illustrates a bottom view of the simulated aircraft of FIG. 3.
Figure 5:
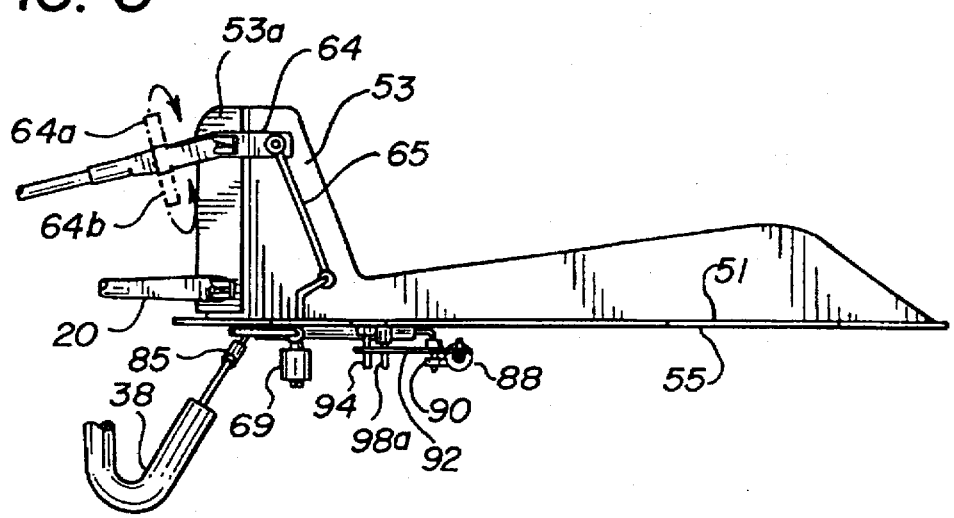
FIG. 5 illustrates a side view of the simulated aircraft of FIG. 1.

FIGS. 3–5 illustrate linkage and control and fuselage surface components associated with aircraft 50 which enable movement of the ailerons and elevator in response to movements of the elevator and aileron activating assemblies of wand 10.

To illustrate control and fuselage surfaces, the underside of simulated aircraft 50 is shown as comprising a gross first plate having wing surfaces 51 and 52, contiguous with a fuselage undersurface, which is attached to a generally perpendicular second plate comprising a simulated forward fuselage section and a rearward tail section 53. Stiffening plates 53a and 53b are illustrated as lending structural support to tail section 53 and are glued or otherwise attached thereto. Elevator surfaces 54a and 54b are arranged generally perpendicular to the tail section and mounted to linkage for enabling elevator control surface movement by saddle means (not shown). Aileron control surfaces 55 and 56 are illustrated as hingedly connected to trailing end surfaces 51a and 52a of wing surfaces 51 and 52 respectively by flexible hinges 57 and 58. In the illustrated embodiment, flexible hinges 57 and 58 comprise a flexible material which adheres along the leading end surfaces 55a and 56a respectively of the ailerons and along trailing end surfaces 51a and 52a of the wing surfaces.

Referring now to the elevator operation, connecting rod 17 comprising pivot fitting 18a is pivotally connected to an upper portion of tail section 53 by means of pin 61, which inserts through aligned holes in pivot fitting 18a, stiffening plates 53a and 53b and the vertical tail section and is fixed in place by pin clip 62, spacer 63 and lever tab 64. Lever tab 64 comprises tab ends 64a and 64b, which upon assembly are crimped over pivot fitting 18a and fixed thereto in an arrangement such that as pivot fitting 18a pivots in respect to the tail section, end 64c pivots through a complementary arc. End 65a of link 65 is pivotally mounted through a hole in end 64c of leverage tab 64 and held in place by force fitting 67. End 65b of link 65 is connected at an opposite end to mid-section 68c of elevator link 68 by means of force fitting 69. Ends 68a and 68b of link 68 are fixed to the underside of elevator control surfaces 54a and 54b respectively by saddle plates (not shown) in an arrangement wherein as pivot end 18a pivots in respect to tail section 53, elevator control surfaces 54a and 54b pivot through the plane of the first gross plate of the simulated aircraft.

Pivot fitting 20, which is rotatably connected to tube 12 of wand 10, is pivotally connected to a lower portion of tail section 53 by means of pin 84, which inserts through aligned holes in pivot fitting 20, stiffening plates 53a and 53b and the vertical tail section and is fixed in place by pin clip 86, and spacers 83a, 83b in an arrangement which provides a supporting pivot and rotational point enabling both aileron and elevator operation through movement of tube 11.

Referring now to aileron operation, ends 81b and 82b of links 81 and 82 are illustrated as mounting in end 38b of flexible tube 38, which interconnects at 38a with wand 10, in an arrangement wherein links 81 and 82 interconnect with further linkage to the aileron surfaces reactive to rotational and pivot movement of the simulated aircraft in respect to pivot fitting 20. Thus, ends 81a and 82a of links 81 and 82 respectively, insert into yoke 85 at ends 85a and 85b respectively. End 85c of yoke 85 connects to end 87a of connecting link 87. Connecting link 87 is illustrated as extending through tube 70 which is mounted to the bottom surface of the first plate by a saddle attachment plate (not shown). End 87b of connecting link 87 engages a hole in connecting band 88 and comprises spacer 89.

Connecting band 88 constitutes the reactive connection to the lateral force translation assembly which enables reactive movement of the aileron surfaces in response to rotational movement of tube 11 through an arc in respect to tube 12, as manifested by movement of end 87b of connecting link 87. In the illustrated embodiment, the lateral assembly comprises generally parallel rods 90 and 91 which are pivotally connected therebetween by opposing angled connectors 92 and 93 which comprise an activating and response leg meeting at a vertex. Ends 90a and 90b of activating rod 90 pivotally engage holes 92a and 93a, which are positioned at about an end of an activating leg of each opposing connector 92 and 93. Pivot pins 98a and 98b are fixed at their first ends to wing surfaces adjacent the ailerons and extend downwardly through spacers 99a and 99b and through holes 92b and 93b positioned at about the vertex of the legs of connectors 92 and 93 respectively. Ends 91a and 91b of stabilizing rod 91 comprise holes which are spaced to align with holes 92b and 93b of connectors 92 and 93 and enable force mounting of ends 91a and 91b to corresponding pins 98a,98b and enable rotation of the connectors, through an arc, about the pins. Angled connectors 92 and 93 comprise aileron pin holes 9c and 93c respectively, which are positioned along its respective response leg.

Aileron pins 94 and 95 are fixed at their first ends to ailerons 55 and 56 respectively, and extend downwardly loosely fitting through aileron pin holes 92c and 93c along the response legs of connectors 92 and 93, in an arrangement wherein rotation of aileron pin holes 92c and 93c through an arc in correspondence with the rotation of the response leg, engages the aileron pin against the perimeter of the hole formed in the response leg and forcibly tends to displace the aileron pin forward and backward from its original spacial positioning to enable upward and downward movement of the aileron along its hinge.

During set-up of the mechanism the aileron pins are spaced from the angled connectors such that at a non-engaged position of both aileron pins with the perimeter of the respective aileron pin hole through which they extend in the response leg of their respective angled connector, both ailerons are at rest in about the general plane of the respective wing to which they are hinged. The angled connectors are arranged such that movement of activating rod 91 in a first direction causes the response leg of one angled connector to move through an arc toward the front of the simulated aircraft and movement of the response leg of the other angled connector in an arc toward the rear of the simulated aircraft. Movement of activating rod in the other direction reverses the movement through an arc of the respective response legs.

As the response leg and respective aileron pin hole moves, the respective aileron pin is forced to move in the same direction. Since the aileron pin is connected to the aileron at a fixed angle, usually about perpendicular, only the free end of the pin can move in the direction of movement of the aileron pin hole. As the free end of the pin moves, the angle of the pin in respect to the aileron pin hole changes, causing the aileron to pivot at the hinge and the pin to slip along its length through the aileron pin hole.

Movement of the aileron pin hole toward the rear of the aircraft and away from the aileron hinge causes the pin to slip in a direction outward through the hole and the aileron to pivot upward. Movement of the aileron pin hole toward the front of the aircraft and toward the aileron hinge causes the pin to slip in a direction inward through the hole and the aileron to pivot downward.

I claim:

1. An ergonomically efficient flight instrument comprising a simulated aircraft maneuverably mounted to a manipulatable wand;
    said simulated aircraft comprising a tail member, a moveable elevator surface and a main support wing member having a moveable aileron surface;
    said wand comprising coaxial elongate members comprising an outer tube enabled for rotational and linear movement in relation to an inner elongate member, said wand having means for activating said movable elevator and aileron surfaces at an end thereof;
    wherein said means for activating is arranged to enable moving said elevator surface in coordination with linear movement of said outer tube in respect to said inner member, and enabling moving said aileron surface in coordination with rotational movement of said outer tube with respect to said inner elongate member.

2. The instrument of claim 1 wherein said inner elongate member comprises a rod or tube.

3. The instrument of claim 1 wherein said means for activating is arranged to enable moving said elevator surface through an arc in coordination with linear movement of said outer tube.

4. The instrument of claim 3 wherein said means for activating comprises means pivotally attaching said inner elongate member to a first point at the rear of the aircraft and means for pivotally attaching said outer tube to a second point at the rear of the aircraft, spaced from said first point.

5. The instrument of claim 4 wherein said first and second point are positioned along said tail member in an arrangement wherein linear movement of the outer tube in respect to the inner elongate member enables said tail member to pivot through a plane in an axis of said wand.

6. The instrument of claim 4 wherein said inner elongate member is pivotally and rotatably attached to said first point at the rear of said aircraft.

7. The instrument of claim 4 wherein the outer tube is pivotally connected to an elongated rod member which pivotally mounts at an opposite end to the second point along the rear of said aircraft.

8. The instrument of claim 1 wherein said means for activating is arranged to enable moving said aileron surface through an arc in coordination with rotational movement of said outer tube.

9. The instrument of claim 8 wherein rotation of said outer tube through an arc in a first direction enables aileron surfaces on opposite wings to move in opposite directions.

10. The instrument of claim 1 wherein an end of said wand is arranged for gripping the inner elongate member in about a palm of an operator's hand coincidentally with manipulating the outer tube with the fingers of said operator.

11. The instrument of claim 1 wherein said means for moving said elevator surface and means for moving said aileron surface are enabled through 360 degree rotation of said outer tube about said inner elongate member.

12. The instrument of claim 11 wherein said means enabling aileron surface rotation through 360 degree rotation of said outer tube, comprises slip ring means engaging said inner elongate member of said wand.

13. The instrument of claim 1 wherein said simulated aircraft comprises a simulated fuselage; a simulated, generally vertical tail member, arranged at an end of said fuselage, said tail member comprising moveable elevator surfaces arranged to extend from opposite sides of said tail member; support wing members, arranged to extend from opposite sides of said fuselage and having moveable aileron surfaces on trailing edges thereof; wherein said wand comprises an outer tube enabled for rotational and linear movement in relation to an inner tube in an arrangement wherein said elevator surfaces pivot in coordination with linear movement of said outer tube and said aileron surfaces pivot in coordination with rotational movement of said outer tube.

14. The instrument of claim 13 wherein aileron movement is enabled by connecting means, which are arranged to pivot through an arc in a first plane and slidably engage and displace an aileron pin arranged in an intersecting plane.

15. The instrument of claim 14 wherein an end of said aileron pin is connected to an aileron and said aileron is hinged to a trailing end of said supporting wing.

16. A toy comprising the instrument of claim 1.

* * * * *